United States Patent [19]
Jay

[11] Patent Number: 5,761,029
[45] Date of Patent: Jun. 2, 1998

[54] PLUG-IN POWER MODULE FOR PERSONAL COMPUTER

[76] Inventor: David N. Jay, 6544 E. Rochelle Cr., Mesa, Ariz. 85215

[21] Appl. No.: 767,512

[22] Filed: Dec. 16, 1996

[51] Int. Cl.⁶ .................. G06F 1/16; H04R 1/02
[52] U.S. Cl. .................. 361/683; 361/685; 381/88
[58] Field of Search ................. 361/724, 725, 361/727, 683, 686, 687, 697, 685; 381/28, 87, 88, 120; 455/341, 347; 364/708.1, 710.12; G06F 1/16

[56] References Cited

U.S. PATENT DOCUMENTS

| | | | |
|---|---|---|---|
| 5,124,885 | 6/1992 | Liu | 361/683 |
| 5,311,397 | 5/1994 | Harshberger et al. | 361/683 |
| 5,355,489 | 10/1994 | Bealkowski et al. | 395/700 |
| 5,400,408 | 3/1995 | Lundgren et al. | 381/88 |
| 5,435,737 | 7/1995 | Haga et al. | 439/157 |
| 5,535,281 | 7/1996 | Gulick | 381/28 |
| 5,546,273 | 8/1996 | Harris | 361/697 |
| 5,557,240 | 9/1996 | Lee | 330/297 |

FOREIGN PATENT DOCUMENTS 236799  9/1987  European Pat. Off. .......... 361/686

*Primary Examiner*—Lynn D. Feild
*Attorney, Agent, or Firm*—Cahill, Sutton & Thomas, P.L.C.

[57] ABSTRACT

An audio power amplifier module fits in a disk bay of a computer and bolts to the frame of the computer. The module is powered from the power supply in the computer and uses the frame of the computer as a heat sink. The module includes connectors for attachment to an internal sound board and to external speakers. A volume control is provided on the power module, in addition to the volume control typically included in a sound board.

10 Claims, 1 Drawing Sheet

U.S. Patent    Jun. 2, 1998    5,761,029
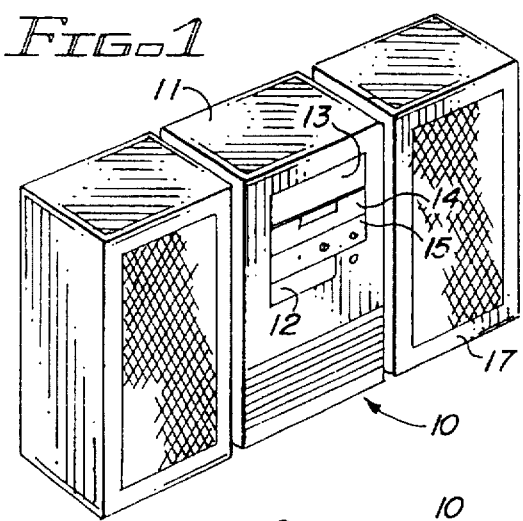
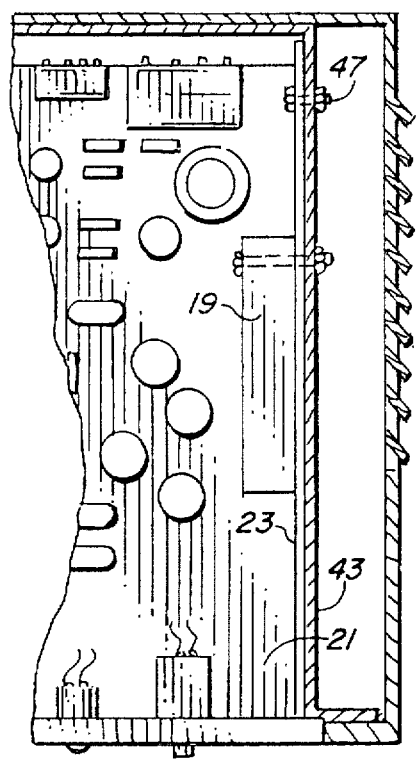
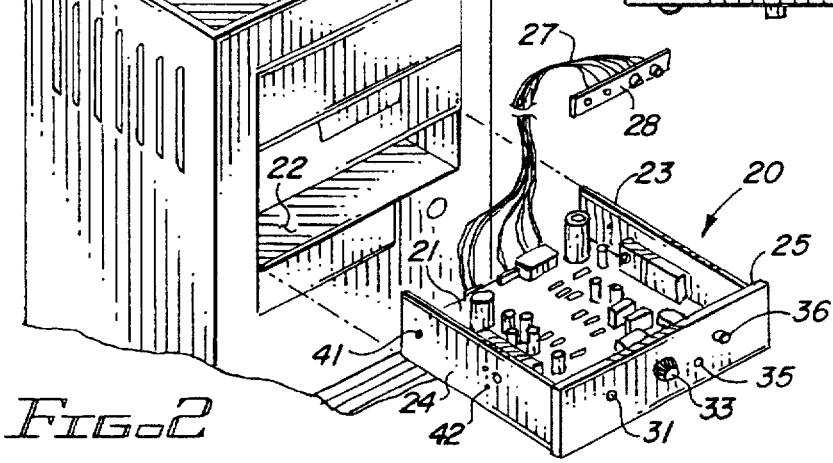
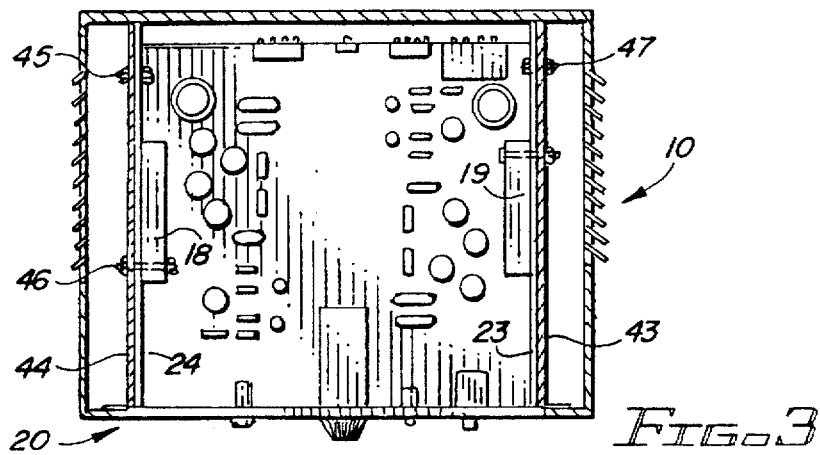

PLUG-IN POWER MODULE FOR PERSONAL COMPUTER

BACKGROUND OF THE INVENTION

This invention relates to multimedia personal computers and, in particular, to a plug-in audio power module for a multimedia personal computer.

The personal computer has evolved quickly since its birth twenty years ago from an electronic typewriter to desktop publishing and from word processing to speaking and listening. The typical computer available today includes a CD ROM drive for storing video, text, and speech, generically referred to as multimedia, that are also available on-line from many services.

Nearly all computers sold today are capable of handling multimedia information but the computers only include the equivalent of a pre-amplifier for sound reproduction. Separate power amplifiers and speakers must be added to obtain high fidelity reproduction of sound. Small, powered speakers are an option but do not provide the high fidelity reproduction available from digital sound sources. One problem with putting a power amplifier in a computer is the power dissipated by the module. The output transistors in an audio power amplifier must be attached to heat sinks and the heat sinks must be adequately ventilated to prevent damage to the amplifier. Thus, sound boards cannot include a power amplifier because the heat sinks would block adjacent slots for printed circuit boards, could heat adjacent boards and, in turn, could be blocked from adequate ventilation by adjacent boards. Further, the conductive traces in a motherboard are too small to supply the current needed by a power amplifier.

Even if presently available sound boards could include adequate heat sinks, there is a compatibility problem in that the buss structure of different brands or models of computers is not the same, even within the generic designations of "IBM clone" or "Mac." Providing a custom power amplifier board for each possible configuration is expensive. Without a custom board, upgrading an older computer to multimedia capability may not be possible.

In the prior art, U.S. Pat. No. 5,557,240 (Lee) describes the combination of a power supply and power amplifier for a computer. U.S. Pat. No. 5,400,408 (Lundgren et al.) discloses a video display including an integral stereophonic amplifier and speakers. U.S. Pat. No. 5,535,281 (Gulick) discloses a low power integrated circuit amplifier for multimedia computers. None of the patented systems is described as universal, or as producing more than a few watts, or as capable of powering external, high fidelity speakers.

In view of the foregoing, it is therefore an object of the invention to provide a plug-in power module that is compatible with any personal computer.

Another object of the invention is to provide a plug-in power module that is compatible with existing sound boards.

A further object of the invention is to provide a plug-in power module that is easily installed in any new or used computer.

Another object of the invention is to provide a plug-in power module for driving external, high fidelity speakers.

SUMMARY OF THE INVENTION

The foregoing objects are achieved by this invention in which a power module fits in a disk bay of a computer and bolts to the frame of the computer. Electrical power is provided by the power cable for a disk drive. The module uses the frame of the computer as a heat sink for the power transistors in the module and locates the power transistors near the frame for low thermal resistance to the frame. The power module includes connectors for coupling the power module to an internal sound board and to external speakers. A volume control is provided on the power module, in addition to the volume control typically included in a sound board.

BRIEF DESCRIPTION OF THE DRAWINGS

A more complete understanding of the invention can be obtained by considering the following detailed description in conjunction with the accompanying drawings, in which:

FIG. 1 illustrates a personal computer, including a plug-in power module constructed in accordance with the invention, between two high fidelity speakers;

FIG. 2 is a partially exploded view of a computer and a plug-in power module constructed in accordance with the invention;

FIG. 3 is a top view of a plug-in module in place in the disk bay of a computer; and FIG. 4 is a detailed view of the plug-in module showing the thermal connection to the frame of a computer.

DETAILED DESCRIPTION OF THE INVENTION

In FIG. 1, computer 10 includes case 11 mounted on a frame for enclosing power supply, a CPU board, memory, a sound board, a video board, and other printed circuit boards. The frame for computer 10 defines several bays for receiving several drives, e.g. floppy disk drive 12, hard drive 13, and CD ROM drive 14. Plug-in audio power module 15 fits within a bay for a disk drive. Module 15 is coupled to the power supply within computer 10 by a four conductor cable as used for powering a hard disk. Audio power from module 15 is coupled to external, high fidelity speakers 16 and 17 for full fidelity sound reproduction. Although computer 10 is illustrated as a "tower" type of computer, module 15 can be used with a "desk top" configuration computer or any other design because the module is proportioned to fit the bay for a disk drive.

FIG. 2 is a partially exploded view of a computer and a plug-in audio power amplifier. Module 20 includes printed circuit board 21 attached to a small metal chassis having sides 23 and 24 and a bottom extending underneath the printed circuit board. Front panel 25 is attached to the sides of the chassis and provides a filler for the disk bay when module 20 is in place. Front panel 25 includes headphone jack 31, volume control 33, indicator light 35, and power switch 36.

Cabling 27 includes a plurality of wires for connecting printed circuit board 21 to terminal strip 28. The connector to the power supply in computer 10 preferably includes a four wire plug like those used for supplying power to a hard disk. Such plugs are shaped to be inserted in a socket on only one orientation.

The connectors to a sound board (not shown) include phone jacks that match the plugs from the sound board. In a preferred embodiment of the invention, headphone jack 31 is wired in parallel with the phono input connectors on terminal strip 28 to enable headphones to be used when private listening is preferred. Headphone jack 31 preferably includes a cut-out switch for disabling module 20 when a plug is inserted into the jack. Strip 28 is mounted at the rear of computer 10 to avoid having speaker wires attached to the front of the computer and includes suitable jacks for connection to a sound board.

Sides 23 and 24 of module 20 are fourteen to sixteen gauge aluminum sheet, each including a plurality of holes, such as holes 41 and 42, for attaching the module to the frame of computer 10. The holes align with holes in the frame for attaching a disk drive to computer 10. By utilizing the relatively standard placement of such holes, a module constructed in accordance with the invention can fit present, past, and future models of computers.

FIG. 3 is a top view of module 20 illustrating the connection of the module to computer 10 and FIG. 4 illustrates the right-hand portion of the module in greater detail. Power amplifiers 18 and 19 are mechanically and thermally attached to sides 24 and 23, respectively. Sides 23 and 24 do not have sufficient mass in themselves to act as a heat sink for the power amplifiers. In accordance with the invention, side 23 is butted against frame 43 of computer 10 and side 24 is butted against frame 44 of the computer. The sides are held in place by fasteners 45, 46 and 47, which can be any suitable fastener such as a sheet metal screw or a small bolt and nut. Frame members 43 and 44 are brought into mechanical and thermal contact with the sides of module 20, thereby increasing the heat sinking capability of the sides.

As shown in greater detail in FIG. 4, power amplifier 19 is in thermal contact with side 23 and side 23 is in thermal contact with frame 43. Thus, the entire frame of the computer acts as a heat sink for the amplifier. Printed circuit board 21 includes interface circuitry for coupling signals to amplifiers 18 and 19. The functions of a preamplifier (e.g. voltage amplification, channel separation, and tone adjustment) are provided by the sound board. Amplifiers 18 and 19 are each preferably a hybrid power module capable of providing 12-40 watts of power into an eight ohm load. In one embodiment of the invention, amplifiers 18 and 19 each included a Toshiba TA8225 amplifier. At twelve to forty watts per channel, module 20 can drive even relatively inefficient speakers to produce realistic sounds in the vicinity of the computer.

The invention thus provides a plug-in power amplifier that is compatible with any personal computer and that is compatible with existing sound boards. The plug-in power amplifier is easily installed in any new or used computer and provides ample power for driving external, high fidelity speakers. The multimedia experience is thus greatly enhanced without the clutter of a separate amplifier wired to the computer.

Having thus described the invention, it will be apparent to those of skill in the art that various modifications can be made within the scope of the invention. For example, the number of external controls on the plug-in power amplifier depends upon the flexibility desired and the capabilities of a particular sound board. For example, a front panel having only an on-off switch and a headphone jack can be used where a sound board provides software control of volume, tone, balance, and ambiance. Conversely, these controls can be included in the front panel. While described as fitting within a disk bay, the module can be sized to fit the bay for a CD ROM, a hard drive, or a floppy drive. A less highly integrated amplifier than modules 18 and 19 can be used instead. That is, the amplifier for each channel can include several semiconductor devices. In accordance with the invention, the power transistors of such an amplifier are attached to sides 23 and 24 for cooling.

What is claimed as the invention is:

1. A computer equipped with an audio power module, said computer comprising:
    a. A computer frame for supporting components of the computer, said computer frame including at least one disk drive bay, said computer frame including first and second opposing frame members located on opposing sides of said disk drive bay;
    b. an audio power module chassis having a bottom and first and second opposite sides, said first and second opposite sides of said chassis being spaced apart from each other to fit within said disk drive bay of said computer frame;
    c. a circuit board supporting audio amplifier components, said circuit board being secured to and supported by said chassis;
    d. at least one audio power amplifier electrically coupled to said circuit board, said audio power amplifier being secured to the first side of said chassis; and
    e. attachment means for attaching said first side of said chassis to the first frame member of said computer frame for thermally coupling said audio power amplifier to the computer frame through said first side of said chassis.

2. A computer equipped with an audio power module as set forth in claim 1 and further including:
    a computer case enclosing said computer frame, said computer case including an opening adjacent said disk drive bay; and
    a front panel attached to said chassis for filling the opening in said computer case adjacent said disk drive bay.

3. A computer equipped with an audio power module as set forth in claim 1 and further comprising:
    a power supply supported by said computer frame, said power supply including a plurality of power cables of the type used to provide power to a disk drive; and
    said circuit board including a power supply connector adapted to receive one of said plurality of power cables.

4. A computer equipped with an audio power module as set forth in claim 1 and further including:
    a front panel attached to said chassis;
    a headphone jack on said front panel; and
    an on-off switch on said front panel.

5. A computer equipped with an audio power module as set forth in claim 4 wherein said circuit board includes an input terminal and said headphone jack is coupled to the input terminal of said circuit board.

6. A multimedia computer comprising:
    a frame defining a bay for receiving a disk drive;
    a power supply;
    a sound board coupled to said frame;
    an audio power module including a chassis having a bottom and opposed sides, said sides being spaced to fit said bay, and an audio power amplifier attached to one of said sides;
    wherein said module is electrically coupled to said sound board; and
    wherein said one side is mechanically and thermally attached to said frame for thermally coupling said power amplifier to the frame through said one side.

7. A multimedia computer as set forth in claim 6 and further including:
    a front panel attached to said chassis for filling the bay when said module is in said bay.

8. A multimedia computer as set forth in claim 6 and further comprising:

cabling for coupling said module to said power supply.

9. A multimedia computer module as set forth in claim 6 and further including:

a front panel attached to said chassis;

a headphone jack on said front panel;

an on-off switch on said front panel.

10. A multimedia computer as set forth in claim 9 wherein said module includes a pair of audio power amplifiers thermally and mechanically attached one each to said sides; and wherein said sides are mechanically and thermally attached to said frame for thermally coupling both power amplifiers to the frame.

* * * * *